(12) United States Patent
Xie et al.

(10) Patent No.: US 11,412,378 B2
(45) Date of Patent: *Aug. 9, 2022

(54) SMOOTHING TECHNOLOGY-BASED BLIND AUTHENTICATION METHOD AND SYSTEM FOR FREQUENCY SELECTIVE FADING CHANNEL

(71) Applicant: Shenzhen University, Guangdong (CN)

(72) Inventors: Ning Xie, Guangdong (CN); Li Zhang, Guangdong (CN)

(73) Assignee: Shenzhen University, Shenzhen (CN)

( * ) Notice: Subject to any disclaimer, the term of this patent is extended or adjusted under 35 U.S.C. 154(b) by 236 days.

This patent is subject to a terminal disclaimer.

(21) Appl. No.: 16/772,749

(22) PCT Filed: Dec. 13, 2017

(86) PCT No.: PCT/CN2017/116025
§ 371 (c)(1),
(2) Date: Jun. 12, 2020

(87) PCT Pub. No.: WO2019/113864
PCT Pub. Date: Jun. 20, 2019

(65) Prior Publication Data
US 2020/0322796 A1    Oct. 8, 2020

(51) Int. Cl.
*H04W 12/06*    (2021.01)
*H04L 25/03*    (2006.01)
(Continued)

(52) U.S. Cl.
CPC .......... *H04W 12/06* (2013.01); *H04L 9/0875* (2013.01); *H04L 9/3215* (2013.01); *H04L 9/3228* (2013.01); *H04L 25/03159* (2013.01)

(58) Field of Classification Search
CPC .... H04W 12/06; H04L 9/3215; H04L 9/3228; H04L 9/0875
See application file for complete search history.

(56) References Cited

U.S. PATENT DOCUMENTS 7,929,409 B2 *   4/2011   Chitrapu ............... H04L 1/0061
                                                370/208
9,088,447 B1 *   7/2015   Koike-Akino ........ H04L 1/0061
(Continued)

FOREIGN PATENT DOCUMENTS

CN    105635125 A    6/2016
CN    107196920 A    9/2017

OTHER PUBLICATIONS

S. Zhang, S. Liew and H. Wang, "Blind Known Interference Cancellation," in IEEE Journal on Selected Areas in Communications, vol. 31, No. 8, pp. 1572-1582, Aug. 2013. (Year: 2013).*
(Continued)

*Primary Examiner* — Kari L Schmidt
(74) *Attorney, Agent, or Firm* — Klarquist Sparkman, LLP

(57) ABSTRACT

Disclosed is a blind authentication method for a frequency selective fading channel based on a smoothing technique. The method includes: transmitting carrier signals to a frequency selective fading channel having multiple paths, where each carrier signal includes an authentication signal, a pilot signal and an information signal, receiving the carrier signals, performing BKIC processing on a carrier signal in each path to obtain a target signal, and performing differential signal processing on the target signal to obtain a target authentication signal, obtaining a reference signal based on a key and the pilot signal in the each path, performing the differential signal processing on the reference signal to obtain a reference authentication signal, and calculating a correlation between the target authentication signal and the reference authentication signal to obtain a test statistic; and comparing the test statistic with a prescribed threshold to determine whether the carrier signal in the each of the plurality of paths can pass authentication.

11 Claims, 4 Drawing Sheets

(51) Int. Cl.
  *H04L 9/32* (2006.01)
  *H04L 9/08* (2006.01)

(56) References Cited

U.S. PATENT DOCUMENTS

| | | | |
|---|---|---|---|
| 9,247,430 B2* | 1/2016 | Kountouris | H04W 12/06 |
| 9,538,040 B2* | 1/2017 | Goergen | H04N 1/32144 |
| 9,673,920 B2* | 6/2017 | Sen | H04L 63/1433 |
| 10,129,709 B1* | 11/2018 | Sivaraman | H04L 5/0048 |
| 10,491,261 B1* | 11/2019 | Al-Eidan | H04B 17/336 |
| 10,536,315 B2* | 1/2020 | Bala | H04L 27/2613 |
| 2002/0150109 A1* | 10/2002 | Agee | H04W 12/08 |
| | | | 370/442 |
| 2004/0203397 A1* | 10/2004 | Yoon | H04L 1/206 |
| | | | 455/67.11 |
| 2007/0165845 A1* | 7/2007 | Ye | H04L 9/0875 |
| | | | 380/30 |
| 2010/0246825 A1* | 9/2010 | Baras | H04L 63/08 |
| | | | 380/270 |
| 2011/0040619 A1* | 2/2011 | Jebara | G06Q 30/0247 |
| | | | 705/14.46 |
| 2013/0036084 A1* | 2/2013 | Lee | G06N 5/00 |
| | | | 375/240 |
| 2013/0163761 A1* | 6/2013 | Baras | H04W 12/106 |
| | | | 380/270 |
| 2013/0230119 A1* | 9/2013 | Dhakal | H04B 7/0456 |
| | | | 375/295 |
| 2014/0040985 A1* | 2/2014 | Wang | H04W 12/065 |
| | | | 726/3 |
| 2015/0143462 A1* | 5/2015 | Li | H04L 47/2425 |
| | | | 726/3 |
| 2015/0230105 A1* | 8/2015 | Negus | H04W 48/16 |
| | | | 370/329 |
| 2016/0044034 A1* | 2/2016 | Spilman | H04L 63/0876 |
| | | | 713/181 |
| 2017/0085396 A1* | 3/2017 | Hu | H04L 5/0007 |
| 2022/0012314 A1* | 1/2022 | Silverman | G06F 21/316 |

OTHER PUBLICATIONS

N. Xie and S. Zhang, "Blind Authentication at the Physical Layer Under Time-Varying Fading Channels," in IEEE Journal on Selected Areas in Communications, vol. 36, No. 7, pp. 1465-1479, Jul. 2018. (Year: 2018).*

Zhang, Pinchang, Guozhu Zhao, and Lisheng Ma. "PHY-layer Authentication for IoT Devices Using Frequency Offset Feature." Proceedings of the 1st International Workshop on Physical-Layer Augmented Security for Sensor Systems., pp. 22-25. 2020. (Year: 2020).*

Ren, Chao, et al. "Three-path successive relaying protocol with blind inter-relay interference cancellation and cooperative non-coherent detection." Wireless Communications and Mobile Computing 16.17 (2016): 2778-2791. (Year: 2016).*

International Search Report for PCT/CN2017/116025, dated Aug. 29, 2018, 4 pages.

Ji et al., "Physical Layer Authentication Scheme Based on Hash Method," *Journal of Electronics & Information Technology*, vol. 38, No. 11, Nov. 2016, 8 pages.

* cited by examiner

SMOOTHING TECHNOLOGY-BASED BLIND AUTHENTICATION METHOD AND SYSTEM FOR FREQUENCY SELECTIVE FADING CHANNEL

CROSS REFERENCE TO RELATED APPLICATIONS

This is a national stage application, filed under 37 U.S.C. 371, of International Patent application No. PCT/CN2017/116025, filed on Dec. 13, 2017.

TECHNICAL FIELD

The present disclosure relates to the field of wireless communication technologies, and in particular to a blind authentication method and system for a frequency selective fading channel based on a smoothing technique.

BACKGROUND

At present, three main physical layer authentication technologies exist. The first authentication technology is the Spread Spectrum Authentication method (Auth-SS). The basic idea is to use the traditional direct-sequence spread spectrum or frequency hopping technology. Since different pulses use different frequencies, this technology requires a certain amount of bandwidth to achieve authentication. In addition, a key limitation of the Auth-SS technology is that only users who understand prior knowledge of the spread spectrum technology are involved in the communication. Therefore, the scope of application of this technology is relatively narrow.

The second authentication technology is based on the Authentication with Time Division Multiplexing) (Auth-TDM). The basic idea is that the transmitter periodically sends information signals and authentication signals alternately. After receiving a signal, the receiver directly extracts the desired authentication information to implement authentication of the signal. The Auth-TDM is an authentication technology proposed in the early development of wireless communication. The advantage is that it is easy to operate, and that authentication signals and information do not need to be pre-processed (encryption may be performed for security reasons) before signals are transmitted. The authentication signal is transmitted independently of the information signal, so the authentication signal needs to occupy a certain amount of bandwidth. With the increasing amount of wireless information, further improvement of information privacy for users and the continuous enhancement of attack technologies of the enemy, the security of this authentication technology is greatly challenged and cannot meet the requirements of users.

The third authentication technology is the Authentication with Superimposition (Auth-SUP). The basic idea is to superimpose the authentication signal on the information signal (the superimposition manner may be arbitrary and is determined by the key), and then the transmitter simultaneously transmits the authentication signal and the information signal, and after the receiver receives the signals, the authentication signal in the superimposed signals is extracted by using the key to achieve the purpose of signal authentication.

Compared with the early Auth-TDM technology, in the Auth-SUP authentication technology, the authentication signal and the information signal need to be processed before signal transmission, a certain signal processing capacity of the transmitter is required, which is more complicated to achieve than the Auth-TDM technology, and the authentication signal and the information signal are simultaneously sent, so that extra bandwidth is not occupied. At this time, since the authentication signal is superimposed in the information signal, the receiver needs to extract the information after receiving the signal, so the signal processing difficulty is higher than that of the Auth-TDM technology, but the concealment of the authentication information is higher than that of the Auth-TDM. In addition, since the authentication signal plays a role of noise for the extraction of the information signal, the signal-to-noise ratio (SNR) of the receiver is correspondingly reduced, which adversely affects the extraction of the information signal.

In the existing Auth-TDM and Auth-SUP authentication technologies, another pilot signal is further transmitted in addition to the information signal and the authentication signal since for the two authentication technologies, the receiver needs to estimate the channel parameters and recover the symbols after receiving the signals and then extracts the authentication signal, so that a certain signal processing capability of the receiver is also required. In some specific cases, these signal processing technologies may not be feasible and may easily cause estimation errors in the channel parameter estimation and symbol recovery processes, which may adversely affect the final extraction of the authentication signal.

In addition, the Auth-TDM, the Auth-SS, and the Auth-SUP expose the fact that authentication information is included. Auth-SS and Auth-TDM technologies are more likely to attract the attention of other users in the scenario, especially hostile users, compared with conventional signals that do not include authentication information. The hostile user analyzes, counterfeits or tampers with the signal, and the legitimate receiver cannot authenticate the expected signal. Relatively speaking, the concealment of the Auth-SUP authentication technology is significantly higher than that of Auth-SS and Auth-TDM. However, this superiority is based on the premise that the computing power of the hostile user is limited. Once the computing power of the hostile user is increased, it is also possible for the hostile user to extract or even destroy the authentication information.

It must be mentioned that the existing Auth-SS technology and Auth-SUP technology have a severe performance degradation in the frequency selective fading channel scenario. The reality is that as the number of wireless communication users continues to increase, the communication environment will become more complex and the possibility of interference will increase. As the number of urban communication users increases and the city continues to develop, the simple time invariant fading channel or the simple time-varying fading channel is not sufficient to characterize the current communication environment. In particular, due to the blocking of urban buildings, multipath fading becomes normal. Therefore, it is necessary to consider the wireless communication physical layer authentication technology based on the frequency selective fading channel to improve the security of wireless communication and meet the communication security requirements of users.

SUMMARY

In view of the above, the present disclosure aims to provide a blind authentication method and system for a frequency selective fading channel based on a smoothing technique. In the method, device and system, extra signal bandwidth is not needed, the authentication signal does not become noise affecting the extraction of an information signal in a carrier signal, and the statistical characteristic of the noise at the receiver is not affected.

Thus, in a first aspect of the present disclosure, a blind authentication method for a frequency selective fading channel based on a smoothing technique is provided, and is a physical layer authentication method for wireless communication of a wireless communication system having a transmitter and a receiver. The method includes: transmitting, by the transmitter, carrier signals to a wireless channel, where each of the carrier signals includes an authentication signal, a pilot signal, and an information signal, the authentication signal is superimposed on the pilot signal, and the wireless channel is a frequency selective fading channel with a plurality of paths; receiving, by the receiver, the carrier signals, performing blind known interference cancellation (BKIC) processing on a carrier signal in each of the plurality of paths of the frequency selective fading channel to obtain a target signal, and performing differential signal processing on the target signal to obtain a target authentication signal, where in the BKIC processing, a pilot signal in the each of the plurality of paths is cancelled through a smoothing technique by using adjacent symbols; obtaining, by the receiver, a reference authentication signal based on a key and the pilot signal in the each of the plurality of paths, and calculating a correlation between the target authentication signal and the reference authentication signal to obtain a test statistic; and determining whether the test statistic is not less than a prescribed threshold to determine whether the carrier signal in the each of the plurality of paths is capable of passing authentication.

In the present disclosure, the authentication signal is superimposed on the pilot signal. Thus, the Signal to Interference plus Noise Ratio at the receiver may not be affected. In the BKIC processing, the pilot signal is cancelled through the smoothing technique by using the adjacent symbols. In this case, the pilot signal can be cancelled through the smoothing technique without channel estimation.

In the blind authentication method provided in the first aspect of the present disclosure, the carrier signal is transmitted in blocks in a form of data blocks to facilitate operation of data.

In the blind authentication method provided in the first aspect of the present disclosure, in each block of the carrier signal, a sum of a length of a pilot signal and a length of an information signal is equal to a length of each carrier signal.

In addition, in the blind authentication method provided in the first aspect of the present disclosure, the reference signal is obtained based on the key and the pilot signal by using a hash matrix. Thus, the reference signal is processed to obtain the reference authentication signal and it can be determined whether the target authentication signal passes the authentication according to the correlation between the reference authentication signal and the target authentication signal.

In the blind authentication method provided in the first aspect of the present disclosure, if the test statistic is not less than the prescribed threshold, the carrier signal passes the authentication.

In the blind authentication method provided in the first aspect of the present disclosure, the prescribed threshold is obtained based on a statistical characteristic of the pilot signal and a preset upper limit of a false alarm probability.

In a second aspect of the present disclosure, a blind authentication device for a frequency selective fading channel based on a smoothing technique is provided. The device includes a processor and a memory. The processor is configured to execute a computer program stored in the memory to implement any physical layer blind authentication method described above.

In a third aspect of the present disclosure, a computer readable storage medium is provided and is configured to store at least one instruction which, when executed by a processor, implements any blind authentication method described above.

In a fourth aspect of the present disclosure, a blind authentication system for a frequency selective fading channel based on a smoothing technique is provided. The system includes a transmitting device and a receiving device. The transmitting device is configured to transmit carrier signals to a wireless channel, where each of the carrier signals includes an authentication signal, a pilot signal and an information signal, the authentication signal is superimposed on the pilot signal, and the wireless channel is a frequency selective fading channel having a plurality of paths. The receiving device includes: a first processing module, a second processing module and a determining module. The first processing module is configured to receive the carrier signals, perform blind known interference cancellation (BKIC) processing on a carrier signal in each of the plurality of paths of the frequency selective fading channel to obtain a target signal, and perform differential signal processing on the target signal to obtain a target authentication signal, where in the BKIC processing, a pilot signal in the each of the plurality of paths is cancelled through a smoothing technique by using adjacent symbols. The second processing module is configured to obtain a reference signal based on a key and the pilot signal in the each of the plurality of paths, perform the differential signal processing on the reference signal to obtain a reference authentication signal, and calculate a correlation between the target authentication signal and the reference authentication signal subjected to the differential signal processing to obtain a test statistic. The determining module is configured to compare the test statistic with a prescribed threshold to determine whether the carrier signal in the each of the plurality of paths is capable of passing authentication.

In the present disclosure, the transmitting device of the blind authentication system superimposes the authentication signal on the pilot signal. Thus, no extra transmitting bandwidth resource is occupied. The receiving device of the blind authentication system performs BKIC processing in which the pilot signal is cancelled through the smoothing technique by using the adjacent symbols. In this case, the receiving device can cancel the pilot signal through the smoothing technique without channel estimation.

In the blind authentication system provided in the fourth aspect of the present disclosure, the second processing module is configured to obtain the reference signal based on the key and the pilot signal using the hash matrix. Thus, the reference signal is processed to obtain the reference authentication signal and it can be determined whether the target authentication signal passes the authentication according to the correlation between the reference authentication signal and the target authentication signal.

In the blind authentication system provided in the fourth aspect of the present disclosure, in the determining module, the prescribed threshold is obtained based on a statistical characteristic of the pilot signal and a preset upper limit of a false alarm probability.

Compared with the existing art, the embodiments of the present disclosure have the beneficial effects below.

Compared with the existing Auth-SS, Auth-SUP, and Auth-TDM, the present disclosure requires no extra signal bandwidth to implement authentication of the physical layer of the wireless communication, the authentication signal does not become noise affecting extraction of the receiving signal, and the statistical characteristics of noise at the receiver is not affected. The blind authentication technology provided by the present disclosure deals with a frequency selective fading channel, and is more applicable to complicated and variable wireless communication environment in the actual communication scenarios. In addition, since in the present disclosure, the authentication signal is superimposed on the pilot signal, if the entire signal obtained by superimposing the authentication signal and the pilot is used as a pilot signal, the accuracy of channel estimation can further be improved.

DETAILED DESCRIPTION

Figure 1:
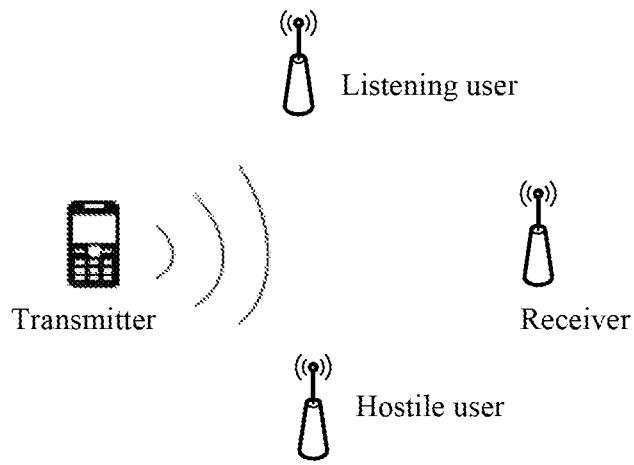
FIG. 1 is a schematic diagram illustrating signal transmission of a physical layer blind authentication method according to an embodiment of the present disclosure.

The preferred embodiments of the present disclosure will be described in detail below with reference to the drawings. In the following description, the same components are denoted by the same reference numerals, and the description thereof will not be repeated. In addition, the drawings are merely schematic and the ratio of the dimensions of the components to each other or the shapes of the components and the like may be different from the actual ones.

It should be noted that the terms "first", "second", "third", "fourth" and the like in the description, claims and above drawings of the present disclosure are used to distinguish between different objects, and are not intended to describe a specific order. Furthermore, the terms "comprises" and "comprising" and any variant thereof are intended to cover a non-exclusive inclusion. For example, a process, method, system, product, or device that includes a series of steps or units is not limited to the listed steps or units, but optionally also includes steps or units not listed, or other steps or units optionally inherent to these processes, methods, products or devices.

The embodiments disclose a blind authentication method, device and system for a frequency selective fading channel based on a smoothing technique, is a physical layer authentication method, device and system for wireless communication of a wireless communication system having a transmitter and a receiver. That is, the embodiments disclose a physical layer blind authentication method, device, and system for a wireless communication frequency selective fading channel based on a smoothing technique. The physical layer authentication can be performed more accurately. The details are described below in conjunction with the drawings.

FIG. 1 is a schematic diagram illustrating signal transmission of a physical layer blind authentication method according to an embodiment of the present disclosure.

In the present embodiment, as shown in FIG. 1, the physical layer blind authentication method for the wireless communication frequency selective fading channel based on the smoothing technique is based on a general signal transmission model. In this signal transmission model, four users are included, the sending party (transmitter) is a legitimate sending party, the transmitter transmits a signal to the legitimate receiving party (the receiver), and the other two receiving parties are a listening user and a hostile user in the system. Once the hostile user finds that authentication information may exist in the signal sent by the transmitter, the hostile user will analyze the signal, and attempt to extract, destroy, or even tamper with the authentication information. However, the embodiment is not limited thereto, two or more transmitters may exist, two or more legitimate receiving parties may exist, and two or more listening users and two or more hostile users may exist.

In the present embodiment, it is assumed that the transmitter and the receiver jointly have a key for authentication, so that the receiver can use the key to extract authentication information from the signal transmitted by the transmitter. The authentication signal includes authentication information. In the present embodiment, the carrier signal includes an authentication signal, and the conventional signal does not include an authentication signal. The listening user knows nothing about the authentication method. Although the listening user can accept and recover the signal sent by the transmitter, the listening user does not analyze the signal in depth and does not affect the authentication process. The hostile user can detect the existence of the authentication signal by analyzing the characteristics of the signal, and intends to destroy the authentication signal.

In the present embodiment, the transmitter in the above signal model may include a base station or a user equipment. The base station (e.g., an access point) may refer to a device in an access network that communicates with a wireless terminal over one or more sectors over an air interface. The base station may be used to convert the received air frame and the IP packet to each other and act as a router between the wireless terminal and the rest of the access network, where the rest of the access network may include an Internet Protocol (IP) network. The base station may also coordinate attribute management of the air interface. For example, the base station may be a Base Transceiver Station (BTS) in Global System for Mobile Communication (GSM) or Code Division Multiple Access (CDMA), or may be a base station (NodeB) in wideband CDMA (WCDMA), or may be an evolutional Node B (NodeB or eNB or e-NodeB) in Long-Term Evolution (LTE), which is not limited in the present embodiment.

The user equipment may include, but is not limited to, a smart phone, a notebook computer, a personal computer (PC), a personal digital assistant (PDA), a mobile Internet device (MID), a wearable device (such as a smart watch, a smart bracelet and smart glasses) and various types of electronic devices, where the operating system of the user equipment may include, but is not limited to, an Android operating system, an IOS operating system, a Symbian operating system, a Black Berry operating system, the Windows Phone 8 operating system and so on, which is not limited in the present embodiment.

In the present embodiment, the transmitter in the above signal model transmits a signal to the receiver through the wireless channel, where the receiver may include the base station. The base station (e.g., an access point) may refer to a device in an access network that communicates with a wireless terminal over one or more sectors over an air interface. The base station may be used to convert the received air frame and the IP packet to each other and act as a router between the wireless terminal and the rest of the access network, where the rest of the access network may include an Internet Protocol (IP) network. The base station may also coordinate attribute management of the air interface. For example, the base station may be a Base Transceiver Station (BTS) in GSM or CDMA, or may be a base station (NodeB) in WCDMA, or may be an evolutional Node B (NodeB or eNB or e-NodeB) in LTE, which is not limited in the present embodiment.

The receiver may further include a user equipment. The user equipment may include, but is not limited to, a smart phone, a notebook computer, a personal computer (PC), a personal digital assistant (PDA), a mobile Internet device (MID), a wearable device (such as a smart watch, a smart bracelet and smart glasses) and various types of electronic devices, where the operating system of the user equipment may include, but is not limited to, an Android operating system, an IOS operating system, a Symbian operating system, a Black Berry operating system, the Windows Phone 8 operating system and so on, which is not limited in the present embodiment.

Figure 2:
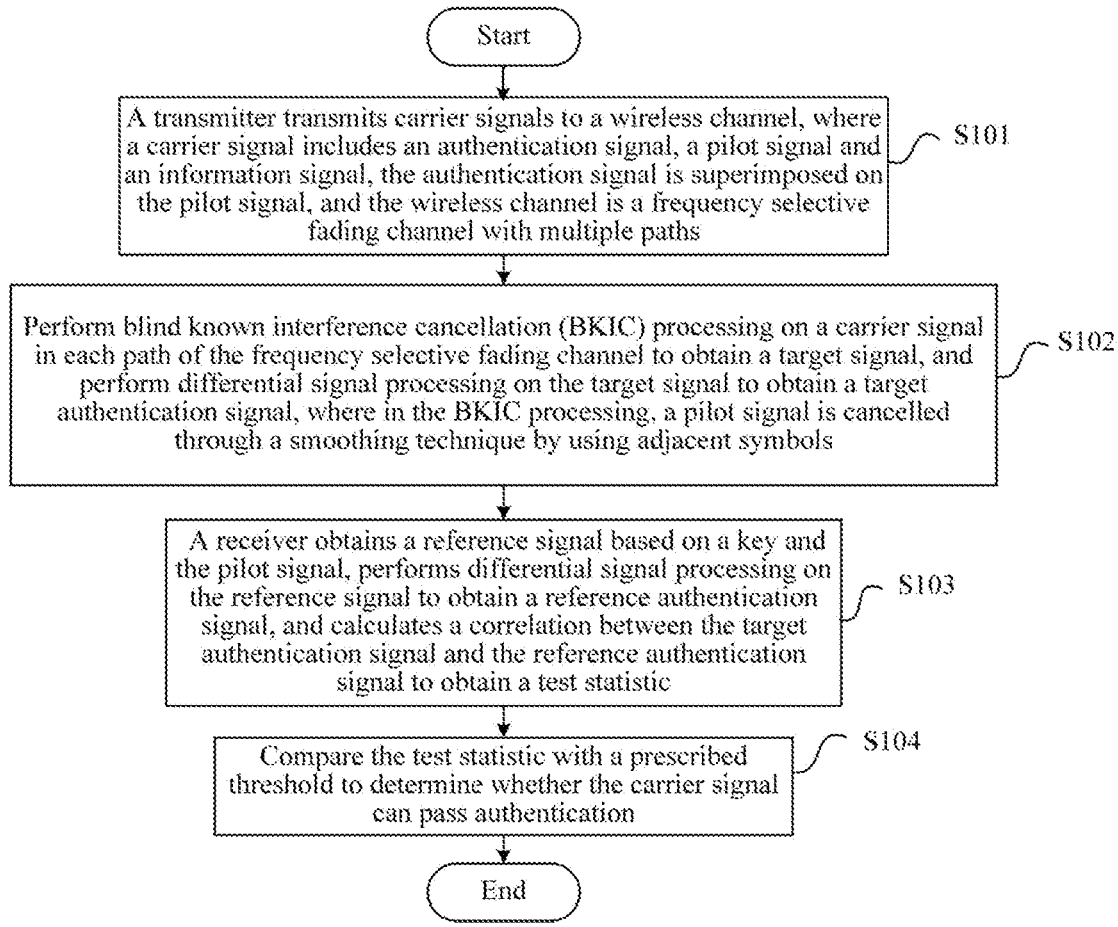
FIG. 2 is a schematic flowchart of a physical layer blind authentication method according to an embodiment of the present disclosure.
Figure 3:
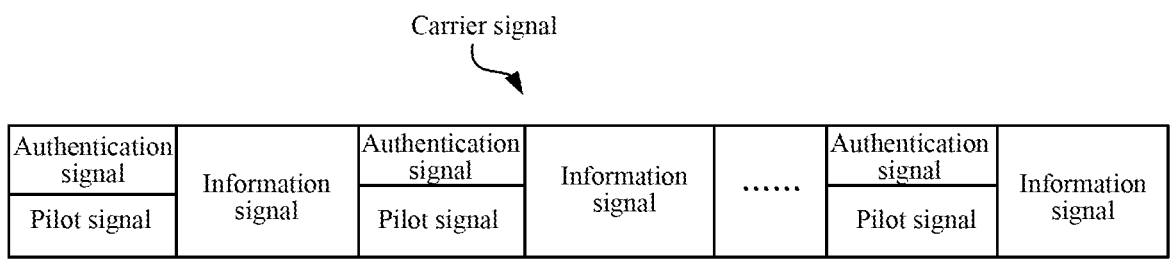
FIG. 3 is a schematic structural diagram of a signal transmitted by a transmitter in a physical layer blind authentication method according to an embodiment of the present disclosure.

The embodiments disclose a physical layer blind authentication method for a wireless communication frequency selective fading channel based on a smoothing technique. FIG. 2 is a schematic flowchart of a physical layer blind authentication method according to an embodiment of the present disclosure. FIG. 3 is a schematic structural diagram of a signal transmitted by a transmitter in a physical layer blind authentication method according to an embodiment of the present disclosure.

In the present embodiment, the physical layer blind authentication method of the wireless communication frequency selective fading channel based on the smoothing technique is a physical layer authentication method for wireless communication of the wireless communication system having the transmitter and the receiver. Based on the signal transmission model described above, as shown in FIG. 2, the transmitter transmits carrier signals to the wireless channel. A carrier signal includes an authentication signal, a pilot signal, and an information signal. The authentication signal is superimposed on the pilot signal. The wireless channel is a frequency selective fading channel with multiple paths (step S101).

In step S101, as shown in FIG. 3, the carrier signal includes an authentication signal, a pilot signal, and an information signal, and the authentication signal is superimposed on the pilot signal. The signal length of the authentication signal is equal to the signal length of the pilot signal. Thus, the superimposition of the authentication signal onto the pilot signal avoids taking up extra signal bandwidth.

In the present embodiment, the information signal includes information to be transmitted by the user at the transmitter. The carrier signal transmitted by the transmitter is transmitted in blocks in the form of data blocks. Each block of the carrier signal includes a pilot portion and an information portion. The pilot portion includes an authentication signal and a pilot signal. The information portion includes an information signal. In addition, the carrier signal is transmitted in blocks in the form of data blocks, which facilitates manipulation of the data.

In the present embodiment, the signal length of the authentication signal or the pilot signal is the first length, the signal length of the information signal is the second length, the length of each block of the carrier signal is the total length, and the sum of the signal length of the authentication signal or the pilot signal and the signal length of the information signal is equal to the length of each block of the carrier signal, that is, the sum of the first length and the second length is equal to the total length.

In the present embodiment, the authentication signal is obtained through the pilot signal and the key, that is, the authentication signal is obtained through the pilot signal and the key using the hash matrix. The obtained authentication signal is superimposed on the pilot signal, and the pilot portion of each block of the carrier signal is obtained. The signal expression of the pilot portion is described below.

$$m_i = \rho_s p_i + \rho_t t_i \tag{1}$$

In the above signal formula (1) of the pilot portion, $\rho_s^2$ and $\rho_t^2$ are the power allocation factors of the pilot information and the authentication signal. Assuming that the authentication signal and the pilot signal are independent of each other, $E\{p_i^H t_i\}=0$ is obtained.

In the present embodiment, the signal of the pilot portion and the information signal of the information portion are combined to form each block of the carrier signal.

Further, in the present embodiment, the transmission channel of the carrier signal is a wireless channel and is a frequency selective fading channel. The frequency selective fading channel has multiple paths, that is, the frequency selective fading channel is a multipath channel. The expression of a carrier signal that has passed through the frequency selective fading channel is described below.

$$y_{iL+k} = h_{iL+k} x_{iL+k} + n_{iL+k} \tag{2}$$

In the present embodiment, the channel response $h_{iL+k}$ of the frequency selective fading channel follows a complex Gaussian distribution with a mean of zero and a variance of $\sigma_h^2$. $n_{iL+k} \sim CN(0, \sigma_n^2)$ is the noise at the receiver, and follows a Gaussian random variable with a mean of zero and a variance of $\sigma_n^2$.

In the present embodiment, in the channel response, $\omega_{iL+k} \sim CN(0, \sigma_\omega^2)$ is dynamic noise, and $\sigma_\omega^2 = (1-a^2)\sigma_h^2$. In general, a is the fading correlation coefficient of the frequency selective fading channel, and is determined by the channel Doppler spread and the transmitting bandwidth. In particular, a small value of a indicates fast fading, and a large value of a indicates slow fading. In many types of scenarios, the value of a is available at the receiver. In the actual wireless system scenario, the value of a ranges in a very small interval, such as $a \in [0.9, 1]$.

In the present embodiment, the physical layer blind authentication method further includes receiving, by the receiver, the carrier signals, performing blind known interference cancellation (BKIC) processing on the carrier signal in each path of the frequency selective fading channel to obtain a target signal. In the BKIC processing, the pilot signal is cancelled through the smoothing technique by using adjacent symbols (step S102).

In the present embodiment, the receiver receives the carrier signals. A carrier signal includes a pilot portion and an information portion. The physical layer blind authentication method according to the present embodiment is mainly used for processing the pilot portion of the carrier signal at the receiver. The expression of a receiving signal of the pilot portion of the carrier signal received at the receiver is described below.

$$y_k = \rho_{d=0}^{D_{max}} h_{k,d}(\rho_s p_{k-d} + \rho_t t_{k-d}) + n_k, \quad iL \leq k \leq iL + L_1 \quad (3)$$

In the present embodiment, the wireless channel is a frequency selective fading channel. A frequency selective fading channel has multiple paths. $D_{max}$ is information about the maximum delay in the multiple paths, and is usually known in broadband wireless communication systems. For example, in an Orthogonal Frequency Division Multiplexing (OFDM) system, the predefined cycle prefix determines the maximum delay in all paths.

In the present embodiment, the following processing for the carrier signal refers to the processing for the pilot portion of the carrier signal.

In the present embodiment, a blind authentication technique is used on each potential path of the frequency selective fading channel. Specifically, first, blind known interference cancellation (BKIC) processing may be performed on the carrier signal in the first path of the frequency selective fading channel, and then the same blind known interference cancellation (BKIC) processing method may be similarly used to remove the pilot signal in the carrier signal in the second path of the frequency selective fading channel, the above-mentioned blind known interference cancellation (BKIC) process is repeated ($D_{max}$+1) times, so that the pilot signal in the carrier signal in each path of the frequency selective fading channel is cancelled. That is, blind known interference cancellation (BKIC) processing is performed on the carrier signal in each path of the frequency selective fading channel in sequence.

In step S102, the receiver receives the carrier signals, and performs blind known interference cancellation (BKIC) processing on the carrier signal in each path of the frequency selective fading channel to obtain the target signal. The blind known interference cancellation (BKIC) processing is to use adjacent symbols to cancel the pilot signal in the carrier signal through the smoothing technique. Usually, the channel situation needs to be estimated for cancelling the pilot signal in the carrier signal. If the channel responds that effective estimation cannot be performed, the pilot signal in the carrier signal is difficult to cancel. With the blind known interference cancellation method, the pilot signal can be cancelled while the estimation of the channel is avoided.

In the present embodiment, the carrier signal received by the receiver may or may not include the authentication signal. That the carrier signal includes the authentication information is set as a first condition, and that the carrier signal does not include the authentication signal is set as a second condition.

Figure 4:
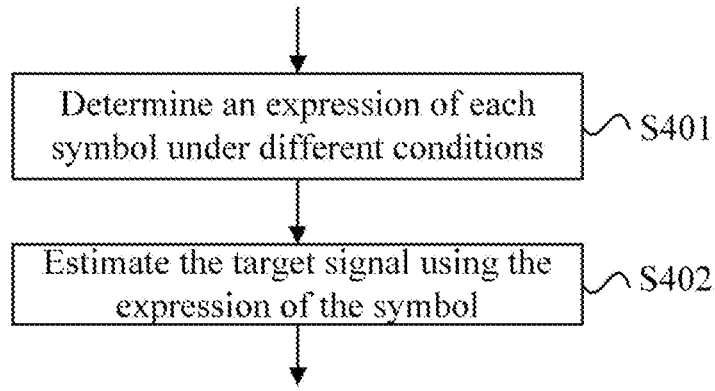
FIG. 4 is a schematic flowchart of a process of blind known interference cancellation (BKIC) processing at a receiver in a physical layer blind authentication method according to an embodiment of the present disclosure.

FIG. 4 is a schematic flowchart of a process of blind known interference cancellation (BKIC) processing at the receiver in the physical layer blind authentication method according to an embodiment of the present disclosure.

In the present embodiment, as shown in FIG. 4, the method of canceling the pilot signal in the carrier signal is the same on each path of the frequency selective fading channel. Specifically, the pilot signal in the carrier signal on each path of the frequency selective fading channel is cancelled by using the BKIC processing method. The BKIC processing method includes determining an expression of each symbol under different conditions (step S401) and estimating the target signal using the expression of the symbol (step S402).

In step S401, an expression of each symbol under different conditions is determined.

Under the first condition, the expression of each symbol is described below.

$$b_k \mid H_1 = y_k - \frac{P_k}{aP_{k+1}} y_{k+1} = \quad (4)$$

$$h_k \rho_t t_k + n_k - \frac{P_k}{aP_{k+1}}(h_{k+1}\rho_t t_{k+1} + n_{k+1}) - \frac{\omega_{k+1}\rho_s P_k}{a}$$

$$k \in \{1, 2, \ldots, L_1 - 1\}$$

Under the second condition, the expression of each symbol is described below.

$$b_k \mid H_0 = n_k - \frac{P_k}{aP_{k+1}} n_{k+1} + \frac{\omega_{k+1} P_k}{a} \quad (5)$$

It can be seen from the above formula that correlation noise exists between adjacent symbols, and the correlation noise in the formula (4) cannot be corrected by the ordinary noise whitening technique, and the correlation noise needs to be cancelled through step S402, and $h_k \rho_t t_k + n_k$ is estimated.

In step S402, the target signal is estimated using the expression of the symbol. The above formula (4) is expressed described below.

$$u_1 = b_1 = h_1 \rho_t t_1 + n_1 - \frac{p_1}{ap_2}(h_2 \rho_t t_2 + n_2) - \frac{\omega_2 \rho_s p_1}{a} \quad (6)$$

$$u_k = u_{k-1} + \frac{p_1}{a^{k-1} p_k} b_k = p_1 \sum_{m=1}^{k} \frac{b_m}{a^{m-1} p_m} = \quad (7)$$

$$h_1 \rho_t t_1 + n_1 - \frac{p_1}{a^k p_{k+1}}(h_{k+1}\rho_t t_{k+1} + n_{k+1}) - \rho_s p_1 \sum_{m=1}^{k} \frac{\omega_{m+1}}{a^m},$$

$$k \in \{2, L, L_1 - 1\}$$

The estimated results can be obtained below.

$$z_1 = \frac{1}{L_1 - 1} \sum_{k=1}^{L_1-1} u_k = h_1 \rho_t t_1 + n_1 + \varepsilon_1 \quad (8)$$

$$z_k = \frac{a^{k-1} p_k}{p_1}(z_1 - u_{k-1}) = h_k \rho_t t_k + n_k + \varepsilon_k \quad (9)$$

Where $\varepsilon_k$ in the formula (9) is the residual signal generated during the interference cancellation process by the BKIC module, and $\varepsilon_k$ can be modeled as a Gaussian distribution. For slow fading, ($a \rightarrow 1$), the variance of $\varepsilon_k$ is small, so the $\varepsilon_k$ in $z_k$ can be removed to obtain the estimated $h_k \rho_t t_k + n_k$, that is, the $h_k \rho_t t_k + n_k$ estimated in each path is added to each other to obtain the estimated target signal without the pilot signal.

In addition, in step S102, the carrier signal is subjected to BKIC processing to obtain a target signal, and the target signal is subjected to differential signal processing to obtain a target authentication signal.

In the present embodiment, the method of differential signal processing is described below.

Under the first condition, the expression of differential signal processing is described below.

$$r_k \mid H_1 = \frac{1}{\rho_t^2} z_k z_{k+1}^* = a|h_k|^2 t_k t_{k+1}^* + \Delta_k, \; iL \le k \le iL + L_1 - 1 \tag{10}$$

Where $\Delta_k$ is the residual signal and may be approximately modeled as a Gaussian random variable with a mean of zero and a variance of $\sigma_{\Delta_k}^2$.

Under the second condition, the expression of the differential signal processing is described below.

$$r_k \mid H_0 = \frac{1}{\rho_t^2}(n_k + \varepsilon_k)(n_{k+1} + \varepsilon_{k+1})^* = \nabla_k \tag{11}$$

Where $\nabla_k$ is a zero-mean complex Gaussian random variable.

In the present embodiment, the physical layer blind authentication method further includes: obtaining, by the receiver, a reference signal based on the key and the pilot signal, performing differential signal processing on the reference signal to obtain a reference authentication signal, and calculating the correlation between the target authentication signal and the reference authentication signal to obtain a test statistic (step S103)

In step S103, obtaining the reference signal based on the key and the pilot signal refers to obtaining the reference signal based on the key and the pilot signal using the hash matrix. Thereby, the reference signal is processed to obtain the reference authentication signal, and whether the target authentication signal passes the authentication can be determined according to the correlation between the reference authentication signal and the target authentication signal.

In step S103, the reference signal is subjected to differential signal processing to obtain the reference authentication signal, and the correlation between the target authentication signal and the reference authentication signal is calculated to obtain the test statistic, and the next determination may be performed according to the value of the test statistic.

In the present embodiment, the reference signal is subjected to differential signal processing to obtain the reference authentication signal. The method of differential signal processing is the same as the differential processing method in the above step S102.

In the above step S102, the carrier signal received by the receiver may include an authentication signal, and that the carrier signal includes the authentication information is set as a first condition, and that the carrier signal does not include the authentication signal is set as a second condition.

At the receiver, for the carrier signal, blind known interference cancellation (BKIC) processing is performed on the carrier signal in each path of the frequency selective fading channel to obtain a target signal, and differential signal processing is performed on the target signal to obtain a target authentication signal. At the receiver, a reference signal is obtained based on the key and the pilot signal. The reference signal is subjected to differential (DP) signal processing to obtain a reference authentication signal. The rules for generating the reference signal by the hash matrix, the key and the pilot signal at the receiver are the same as the rules for generating the authentication signal by the hash matrix, the key and the pilot signal at the transmitter. The reference authentication signal may be regarded as the authentication signal under the first condition. The target authentication signal may be regarded as the carrier signal under the first condition. Thus, the first condition may be expressed as including the reference authentication signal in the target authentication signal; the second condition may be expressed as not including the reference authentication signal in the target authentication signal.

In the present embodiment, the physical layer blind authentication method further includes comparing the test statistic with a prescribed threshold to determine whether the carrier signal can pass the authentication (step S104).

In step S104, if the test statistic is not less than the prescribed threshold, it is determined that the carrier signal passes the authentication; if the test statistic is less than the prescribed threshold, it is determined that the carrier signal has not passed the authentication.

In the present embodiment, if the test statistic is not less than the prescribed threshold, the carrier signal includes the reference authentication signal, that is, the carrier signal passes the authentication; if the test statistic is less than the prescribed threshold, the carrier signal does not include the reference authentication signal, that is, the carrier signal has not passed the authentication.

In addition, in the present embodiment, the prescribed threshold is obtained by assuming the verification condition, and the first condition and the second condition described above are the first condition $H_1$ and the second condition $H_0$ of the assumption verification condition, respectively.

In the present embodiment, under the first condition $H_1$, the expression of the test statistic is as follows:

$$\tau_i \mid H_1 = d_i^H r_i = a \sum_{k=1}^{L_1-1} |h_{iL+k} t_{iL+k} t_{iL+k+1}|^2 + v_i \tag{13}$$

Under the second condition $H_0$, the expression of the test statistic is as follows:

$$\tau_i \mid H_0 = \phi_i = \sum_{k=1}^{L_1-1} t_k^* t_{k+1} \nabla_k \tag{14}$$

Where $$v_i = \sum_{k=1}^{L_1-1} t_k^* t_{k+1} \Delta_k$$

is a Gaussian random variable with a mean of zero and a variance of $\sigma_{v_i}^2 = (L_1-1)\sigma_\Delta^2 \sigma_p^4$. $\phi_i$ is a Gaussian random variable with a mean of zero and a variance of $\sigma_{\phi_i}^2 = (L_1-1)\sigma_\nabla^2 \sigma_p^4$.

In addition, the prescribed threshold $\tau_i^0$ is determined by the false alarm probability $\varepsilon_{FA}$ associated with the $(\tau_i|H_0)$ distribution, and is expressed as follows:

$$\tau_i^0 = \operatorname*{argmin}_\tau \Phi(\tau/\sigma_{\phi_i}) \ge 1 - \varepsilon_{FA} \tag{15}$$

Where $(\tau_i|H_0)$ is the test statistic obtained under the second condition, that is, the statistical characteristic of the pilot signal. Thus, the prescribed threshold may be obtained based on the statistical characteristic of the pilot signal and the preset upper limit of the false alarm probability.

In addition, in the present embodiment, if the identity of the transmitter is authenticated, the authentication signal may be used as an extra pilot signal to recover the signal. Thereby, the performance of signal symbol recovery and the estimation performance of the channel response can be improved.

In addition, in the present embodiment, the authentication signal is superimposed on the pilot signal, avoiding the adverse effect on the extraction of the conventional signal. Thereby, the signal to interference plus noise ratio (SINR) of the receiver is prevented from being reduced.

In the present embodiment, the physical layer blind authentication method of the wireless communication frequency selective fading channel based on the smoothing technique does not need to occupy extra signal bandwidth. In addition, at the receiver, when the information signal is extracted from the carrier signal, the authentication signal does not become the noise of the information signal, that is, the authentication signal does not affect the extraction of the information signal. The authentication signal does not affect the statistical characteristics of the noise at the receiver.

In the present embodiment, the physical layer blind authentication method deals with a frequency selective fading channel with multiple paths, that is, a multipath channel, and is more suitable for a complex and variable wireless communication environment in an actual communication scenario. In addition, the authentication signal is superimposed on the pilot signal. If the entire signal obtained by superimposing the authentication signal and the pilot is used as the pilot signal for channel estimation, the accuracy of the channel estimation can further be improved.

Figure 5:
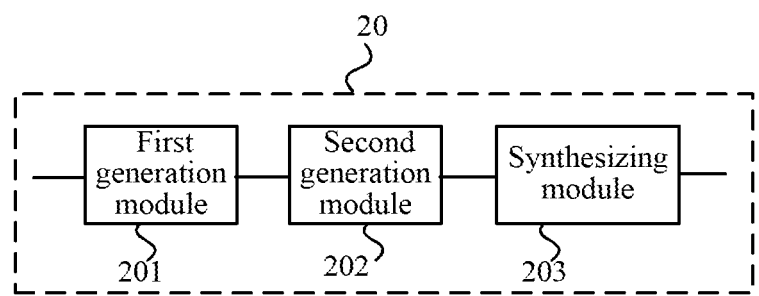
FIG. 5 is a schematic diagram illustrating signal processing modules of a transmitter in a physical layer blind authentication system according to an embodiment of the present disclosure.
Figure 6:
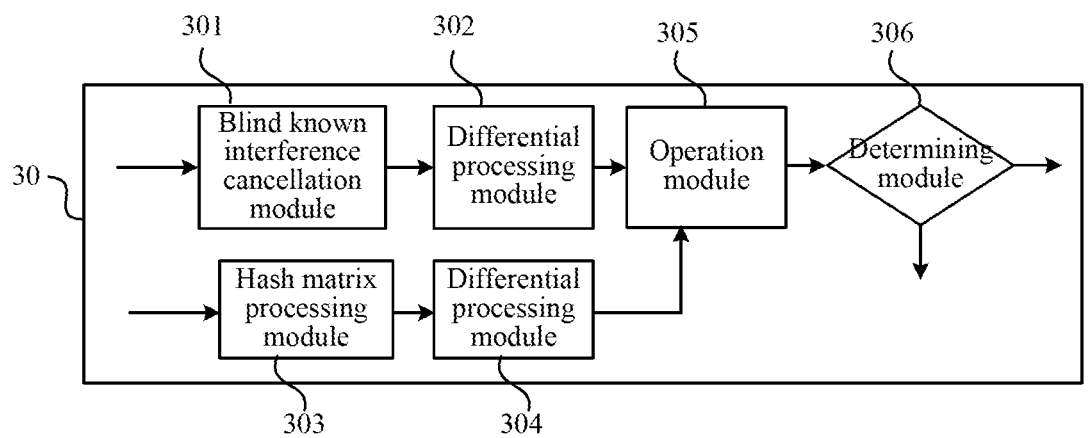
FIG. 6 is a schematic diagram illustrating signal processing modules of a receiver in a physical layer blind authentication system according to an embodiment of the present disclosure.

The embodiments disclose a physical layer blind authentication system for a wireless communication frequency selective fading channel based on a smoothing technique. FIG. 5 is a schematic diagram illustrating signal processing modules of a transmitter in a physical layer blind authentication system according to an embodiment of the present disclosure. FIG. 6 is a schematic diagram illustrating signal processing modules of a receiver in a physical layer blind authentication system according to an embodiment of the present disclosure.

In the present embodiment, as shown in FIG. 5, the physical layer blind authentication system includes a transmitting device 20. The transmitting device 20 includes a first generation module 201, a second generation module 202, and a synthesizing module 203.

In the present embodiment, as shown in FIG. 5, the first generation module 201 generates an authentication signal, that is, the key and the pilot signal generate an authentication signal via the first generation module 201. The first generation module 201 includes a hash matrix. The authentication signal is obtained based on the key and the pilot signal by using a hash matrix. The obtained authentication signal and the pilot signal have the same signal length.

In the present embodiment, as shown in FIG. 5, the second generation module 202 generates a pilot portion of the carrier signal. That is, the authentication signal is loaded onto the pilot signal via the second generation module 202 to generate a pilot portion of the carrier signal. The expression of the pilot portion of the carrier signal is formula (1). In addition, the length of the pilot portion of the carrier signal is the signal length of the authentication signal or the signal length of the pilot signal.

In the present embodiment, as shown in FIG. 5, the synthesizing module 203 generates a carrier signal, that is, the pilot portion and the information portion of the carrier signal are combined via the synthesizing module 203 to generate a carrier signal. The information portion of the carrier signal is an information signal.

In the present embodiment, the carrier signal is sent in blocks according to data blocks, each carrier signal block includes a pilot portion and an information portion, and the sum of the signal length of the authentication signal or the pilot signal and the signal length of the information signal is equal to the length of each carrier signal block. In addition, the carrier signal is transmitted in blocks in the form of data blocks to facilitate operation of the data.

In the present embodiment, the carrier signal generated by the transmitting device 20 at the transmitter reaches the receiving device 30 at the receiver via the wireless channel. In addition, the wireless channel is a frequency selective fading channel with multiple paths.

In the present embodiment, the physical layer blind authentication system further includes a receiving device 30, and the receiving device 30 includes a first processing module, a second processing module, and a determining module.

In the present embodiment, the first processing module includes a blind known interference cancellation (BKIC) module 301. The carrier signal passes through the blind known interference cancellation (BKIC) module 301. Specifically, the carrier signal in each path of the frequency selective fading channel is subjected to blind known interference cancellation (BKIC) processing in the blind known interference cancellation (BKIC) module 301, cancelling the pilot signal in the carrier signal.

In the present embodiment, the blind known interference cancellation (BKIC) module 301 employs the BKIC processing method in step S102 in which the adjacent symbols are used to cancel the pilot signal through the smoothing technique. The specific steps are as shown in FIG. 4. The BKIC processing includes determining an expression of each symbol under different conditions (step S401) and estimating the target signal using the expression of the symbol (step S402).

In the present embodiment, as shown in FIG. 6, the first processing module further includes a differential (DP) processing module 302. The DP processing module 302 employs the differential signal processing method in step S102. The DP processing module 302 performs differential signal processing on the target signal to obtain a target authentication signal. Thereby, the effect of $h_k$ in the target authentication signal is cancelled, i.e., the effect of the channel on the carrier signal is cancelled.

In the DP processing module 302, under the first condition, the expression of the differential signal processing is formula (10), where $\Delta_k$ is the residual signal, which may be approximately modeled as a Gaussian random variable with a mean of zero and a variance of $\sigma_{\Delta_k}^2$. Under the second condition, the expression of the differential signal processing is formula (11), where $\nabla_k$ is a zero-mean complex Gaussian random variable.

In the present embodiment, as shown in FIG. 6, the second processing module further includes a hash matrix processing module 303. A reference signal is obtained based on the pilot signal and the key via the hash matrix processing module 303. The hash matrix processing module 303 employs the method of generating the reference signal in step S103, and the hash matrix processing module 303 includes a hash matrix.

In the present embodiment, as shown in FIG. 6, the second processing module further includes a differential (DP) processing module 304. The differential (DP) processing module 304 performs differential signal processing on the reference signal to obtain a reference authentication signal. The DP processing module 304 employs the differential signal processing method in step S103.

In the present embodiment, as shown in FIG. 6, the second processing module further includes an operation module 305. The operation module 305 is configured to calculate a test statistic of the target authentication signal and the reference authentication signal. The calculation method used by the operation module 305 is the calculation method in step S103.

In the present embodiment, as shown in FIG. 6, the determining module 306 determines whether the target authentication signal passes the authentication by comparing the test statistic with the prescribed threshold, that is, it is determined whether the carrier signal can pass the authentication.

In the present embodiment, the prescribed threshold in the determining module 306 is obtained based on the statistical characteristics of the pilot signal and the preset upper limit of the false alarm probability. The calculation method of the prescribed threshold is the threshold calculation method in step S103.

Figure 7:
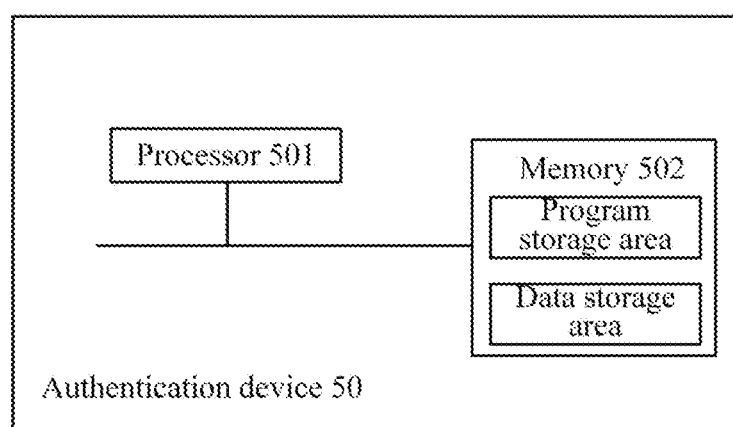
FIG. 7 is a schematic structural diagram of a physical layer blind authentication device according to an embodiment of the present disclosure.

The embodiments disclose a physical layer blind authentication device 50 for a wireless communication frequency selective fading channel based on a smoothing technique. FIG. 7 is a schematic structural diagram of a physical layer blind authentication device according to an embodiment of the present disclosure. In the present embodiment, both the transmitter and the receiver include the authentication device 50 as shown in FIG. 7.

In the present embodiment, as shown in FIG. 7, the authentication device 50 includes a processor 501 and a memory 502. The processor 501 and the memory 502 are separately connected to the communication bus. The memory 502 may be a high speed random access memory (RAM) or a non-volatile memory. It will be understood by those skilled in the art that the structure of the authentication device 50 shown in FIG. 7 does not constitute a limitation of the present disclosure. The structure may be a bus-shaped structure or a star-shaped structure, and may also include more or fewer components than those shown in FIG. 7, or a combination of some components, or a different arrangement of components.

The processor 501 is a control center of the authentication device 50, and may be a central processing unit (CPU). The processor 501 connects various parts of the entire authentication device 50 by using various interfaces and lines, and runs or executes software programs and/or modules stored in the memory 502 as well as calls program codes stored in the memory 502 to perform the operations below.

The transmitter transmits carrier signals to the wireless channel, where a carrier signal includes an authentication signal, a pilot signal and an information signal, the authentication signal is superimposed on the pilot signal, and the wireless channel is a frequency selective fading channel (performed by the authentication device 50 at the transmitter) with multiple paths.

The receiver receives the carrier signals, and performs blind known interference cancellation (BKIC) processing on the carrier signal in each path of the frequency selective fading channel to obtain a target signal, and performs differential signal processing on the target signal to obtain a target authentication signal, where in the BKIC processing, a pilot signal is cancelled through a smoothing technique by using adjacent symbols; the receiver obtains a reference signal based on the key and the pilot signal, performs differential signal processing on the reference signal to obtain a reference authentication signal, and calculates a correlation between the target authentication signal and the reference authentication signal to obtain a test statistic; and the test statistic is compared with a prescribed threshold to determine whether the carrier signal can pass authentication (performed by the authentication device 50 at the receiver).

In the present embodiment, the processor 501 of the authentication device 50 at the transmitter further performs the following operation: the carrier signal is transmitted in blocks in the form of data blocks.

In the present embodiment, the processor 501 of the authentication device 50 at the transmitter further performs the following operation: in each block of the carrier signal, the sum of the signal length of the pilot signal and the signal length of the information signal is equal to the signal length of the carrier signal.

In the present embodiment, the processor 501 of the authentication device 50 at the receiver further performs the following operation: a reference signal is obtained based on the key and the pilot signal using a hash matrix.

In the present embodiment, the processor 501 of the authentication device 50 at the receiver further performs the following operation: if the test statistic is not less than a prescribed threshold, the carrier signal passes the authentication.

In the present embodiment, the processor 501 of the authentication device 50 at the receiver further performs the following operation: the prescribed threshold is obtained based on the statistical characteristic of the pilot signal and the preset upper limit of the false alarm probability.

In the embodiments, it should be understood that the disclosed device may be implemented in other ways. For example, the device embodiments described above are merely illustrative. For example, the division of the units is only a logical function division, and another division manner may be provided in actual implementation. For example, multiple units or components may be combined or integrated into another system, or some features may be omitted or not implemented. In addition, the coupling or direct coupling or communication connection shown or discussed may be an indirect coupling or communication connection through some interfaces, devices or units, and may be electrical or the like.

The units described as separate components may or may not be physically separated, and the components displayed as units may or may not be physical units, that is, may be located in one place, or may be distributed to multiple network units. Some or all of the units may be selected according to actual needs to achieve the purpose of the solution of an embodiment.

In addition, each functional unit in each embodiment may be integrated into one processing unit, or each unit may exist physically separately, or two or more units may be integrated into one unit. The above integrated unit may be implemented in the form of hardware or in the form of a software functional unit.

The integrated unit, if implemented in the form of a software functional unit and sold or used as a standalone product, may be stored in a computer readable memory. Based on such understanding, the technical solution of the present disclosure or the part contributing to the existing art or all or part of the technical solution may be embodied in the form of a software product. The computer software product is stored in a memory and includes several instructions for causing a computer device (which may be a personal computer, server or network device, etc.) to perform all or part of the steps of the methods described in various embodiments of the present disclosure. The foregoing memory includes: a USB flash disk, a Read-Only Memory (ROM), a Random Access Memory (RAM), a removable hard disk, a magnetic disk, or an optical disk, and the like, which may store program codes.

The embodiments disclose a computer readable storage medium. One of ordinary skill in the art will appreciate that all or part of the various steps of the above-described embodiments may be accomplished by a program (instruction) instructing the associated hardware. The program (instruction) may be stored in a computer readable memory (storage medium), and the memory may include: a flash disk, a read-only memory (ROM), a random access memory (RAM), a magnetic disk or a CD, etc.

Although the present disclosure is described in detail in conjunction with the drawings and embodiments, it should be understood that the above description is not intended to limit the present disclosure in any form. Those skilled in the art may make variations and changes without departing from the spirit and scope of the present disclosure, and such variations and changes fall within the scope of the present disclosure.

What is claimed is:

1. A blind authentication method for a frequency selective fading channel based on a smoothing technique, being a physical layer authentication method for wireless communication of a wireless communication system having a transmitter and a receiver and comprising:
    transmitting, by the transmitter, carrier signals to a wireless channel, wherein each of the carrier signals comprises an authentication signal, a pilot signal, and an information signal, the authentication signal is superimposed on the pilot signal, and the wireless channel is a frequency selective fading channel having a plurality of paths;
    receiving, by the receiver, the carrier signals, performing blind known interference cancellation (BKIC) processing on a carrier signal in each of the plurality of paths of the frequency selective fading channel to obtain a target signal, and performing differential signal processing on the target signal to obtain a target authentication signal, wherein in the BKIC processing, a pilot signal in the each of the plurality of paths is cancelled through the smoothing technique by using adjacent symbols;
    obtaining, by the receiver, a reference signal based on a key and the pilot signal in the each of the plurality of paths, performing the differential signal processing on the reference signal to obtain a reference authentication signal, and calculating a correlation between the target authentication signal and the reference authentication signal to obtain a test statistic; and
    comparing the test statistic with a prescribed threshold to determine whether the carrier signal in the each of the plurality of paths is capable of passing authentication.

2. The blind authentication method according to claim 1, wherein each of the carrier signals is transmitted in blocks in a form of data blocks.

3. The blind authentication method according to claim 2, wherein a sum of a length of a pilot signal in each block of the each of the carrier signals and a length of an information signal in the each block of the each of the carrier signals is equal to a length of the each block of the each of carrier signals.

4. The blind authentication method according to claim 1, wherein the reference signal is obtained based on the key and the pilot signal in the each of the plurality of paths by using a hash matrix.

5. The blind authentication method according to claim 1, wherein the carrier signal in the each of the plurality of paths passes the authentication in a case where the test statistic is not less than the prescribed threshold.

6. The blind authentication method according to claim 1, wherein the prescribed threshold is obtained based on a statistical characteristic of the pilot signal in the each of the plurality of paths and a preset upper limit of a false alarm probability.

7. A hind authentication device for a frequency selective fading, channel based on a smoothing technique, comprising:
    a memory, and
    a processor executing a computer program stored in the memory to implement the following steps:
        transmitting, by the transmitter, carrier signals to a wireless channel, wherein each of the carrier signals comprises an authentication signal, a pilot signal, and an information signal, the authentication signal is superimposed on the pilot signal, and the wireless channel is a frequency selective fading channel having a plurality of paths;
        receiving, by the receiver, the carrier signals, performing blind known interference cancellation (BKIC) processing on a carrier signal in each of the plurality of paths of the frequency selective fading channel to obtain a target signal, and performing differential signal processing on the target signal to obtain a target authentication signal, wherein in the BKIC processing, a pilot signal in the each of the plurality of paths is cancelled through the smoothing technique by using adjacent symbols;
        obtaining, by the receiver, a reference signal based on a key and the pilot signal in the each of the plurality of paths, performing the differential signal processing on the reference signal. to obtain a reference authentication signal, and calculating a correlation between the target authentication signal and the reference authentication signal to obtain a test statistic; and
        comparing the test statistic with a prescribed threshold to determine whether the carrier signal in the each of the plurality of paths is capable of passing authentication.

8. A non-transitory computer readable storage medium, which is configured to store at least one instruction which, when executed by a processor, implements the blind authentication method according to claim 1.

9. A blind authentication system for a frequency selective fading channel based on a smoothing technique, comprising a transmitting device and a receiving device;
    wherein the transmitting device is configured to transmit carrier signals to a wireless channel, each of the carrier signals comprises an authentication signal, a pilot signal and an information signal, the authentication signal is superimposed on the pilot signal, and the wireless channel is a frequency selective fading channel having a plurality of paths; and wherein the receiving device comprises:
- a first processing module configured to receive the carrier signals, perform blind known interference cancellation (BKIC) processing on a carrier signal in each of the plurality of paths of the frequency selective fading channel to obtain a target signal, and perform differential signal processing on the target signal to obtain a target authentication signal, wherein in the BKIC processing, a pilot signal in the each of the plurality of paths is cancelled through the smoothing technique by using adjacent symbols;
- a second processing module configured to obtain a reference signal based on a key and the pilot signal in the each of the plurality of paths, perform the differential signal processing on the reference signal to obtain a reference authentication signal, and calculate a correlation between the target authentication signal and the reference authentication signal subjected to the differential signal processing to obtain a test statistic; and
- a determining module configured to compare the test statistic with a prescribed threshold to determine whether the carrier signal in the each of the plurality of paths is capable of passing authentication.

10. The blind authentication system according to claim 9, wherein the second processing module is configured to obtain the reference signal based on the key and the pilot signal in the each of the plurality of paths by using a hash matrix.

11. The blind authentication system according to claim 9, wherein in the determining module, the prescribed threshold is obtained based on a statistical characteristic of the pilot signal in the each of the plurality of paths and a preset upper limit of a false alarm probability.

* * * * *